(12) United States Patent
Hasegawa et al.

(10) Patent No.: US 11,418,657 B2
(45) Date of Patent: Aug. 16, 2022

(54) INFORMATION PROCESSING DEVICE AND CONTROL METHOD THEREFOR

(71) Applicant: CANON KABUSHIKI KAISHA, Tokyo (JP)

(72) Inventors: Yuya Hasegawa, Abiko (JP); Makoto Arima, Abiko (JP); Satoru Ikeda, Kashiwa (JP); Yoshikazu Sato, Nagareyama (JP); Kazuhiro Oyoshi, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 337 days.

(21) Appl. No.: 16/818,382

(22) Filed: Mar. 13, 2020

(65) Prior Publication Data
US 2020/0314256 A1   Oct. 1, 2020

(30) Foreign Application Priority Data
Mar. 25, 2019 (JP) ............................. JP2019-056274

(51) Int. Cl.
| | |
|---|---|
| *H04N 1/00* | (2006.01) |
| *H05B 45/10* | (2020.01) |
| *H05B 47/175* | (2020.01) |
| *H05B 45/00* | (2022.01) |
| *H05B 45/3725* | (2020.01) |
| *H05B 45/30* | (2020.01) |
| *H05B 47/165* | (2020.01) |
| *H05B 47/18* | (2020.01) |

(52) U.S. Cl.
CPC ....... *H04N 1/00076* (2013.01); *H04N 1/0001* (2013.01); *H04N 1/00037* (2013.01); *H05B 45/00* (2020.01); *H05B 45/10* (2020.01); *H05B 45/30* (2020.01); *H05B 45/3725* (2020.01); *H05B 47/165* (2020.01); *H05B 47/175* (2020.01); *H05B 47/18* (2020.01)

(58) Field of Classification Search
CPC ............ H04N 1/00076; H04N 1/0001; H04N 1/00037; H05B 45/00; H05B 45/10; H05B 45/30; H05B 45/3725; H05B 47/10; H05B 47/165; H05B 47/175; H05B 47/155; H05B 47/18; G01D 7/00
See application file for complete search history.

(56) References Cited

U.S. PATENT DOCUMENTS

| | | | |
|---|---|---|---|
| 5,432,907 A | 7/1995 | Picazo, Jr. | |
| 5,519,832 A | 5/1996 | Warchol | |
| 5,588,144 A | 12/1996 | Inoue | |
| 6,061,391 A | 5/2000 | Sasaki | |
| 6,157,956 A | 12/2000 | Jensen | |
| 2007/0262977 A1 | 11/2007 | Liu | |
| 2008/0030362 A1* | 2/2008 | Huang | .................... H04L 41/22 709/224 |
| 2009/0300640 A1 | 12/2009 | Akitomi | |

(Continued)

FOREIGN PATENT DOCUMENTS

| | | |
|---|---|---|
| JP | 2015-108593 A | 6/2015 |
| WO | 2017152977 A1 | 9/2017 |

*Primary Examiner* — Daniel D Chang
(74) *Attorney, Agent, or Firm* — Canon U.S.A., Inc. IP Division

(57) ABSTRACT

A light-emitting diode (LED) is made brighter when the turning-on is controlled by a central processing unit (CPU) than when the turning-on is controlled by a local area network (LAN) controller.

21 Claims, 11 Drawing Sheets

(56) References Cited

U.S. PATENT DOCUMENTS

| | | |
|---|---|---|
| 2010/0062805 A1 | 3/2010 | Moran |
| 2010/0095145 A1 | 4/2010 | Chan |
| 2011/0131437 A1 | 6/2011 | Shimazaki |
| 2012/0290884 A1 | 11/2012 | Hamaguchi |
| 2016/0133112 A1* | 5/2016 | Kawamoto ............. G08B 5/36 340/664 |
| 2016/0316072 A1 | 10/2016 | Mori |
| 2017/0123954 A1 | 5/2017 | Shih |
| 2020/0314249 A1 | 10/2020 | Ikeda |
| 2020/0314255 A1 | 10/2020 | Arima |
| 2020/0314256 A1 | 10/2020 | Hasegawa |

\* cited by examiner

LED TURNING-ON PATTERN A

NOTIFYING LED 132: OFF
NOTIFYING LED 133: OFF

LED TURNING-ON PATTERN B

NOTIFYING LED 132: ON
NOTIFYING LED 133: OFF

LED TURNING-ON PATTERN C

NOTIFYING LED 132: OFF
NOTIFYING LED 133: ON

LED TURNING-ON PATTERN D

NOTIFYING LED 132: OFF
NOTIFYING LED 133: BLINKING

INFORMATION PROCESSING DEVICE AND CONTROL METHOD THEREFOR

BACKGROUND

Field

The present disclosure relates to a technique for controlling the turning on and off of a light-emitting unit.

Description of the Related Art

Conventionally, an information processing device such as a personal computer or a copying machine notifies a user or a service engineer of an abnormality of the device. With this notification, the user can perform a correct recovery process for the device, and a service engineer can specify a part required for repairing the device.

Japanese Patent Laid-Open No. 2015-108593 discloses a system where a light-emitting diode (LED), which is controlled so as to be turned on and off by a local area network (LAN) controller, is turned on and off by a voltage monitoring circuit that monitors the rise of each system voltage generated by a power supply circuit to provide notification of an abnormality of the system voltage.

SUMMARY

However, in accordance with an aspect of the present disclosure, it has now been determined that in Japanese Patent Laid-Open No. 2015-108593, the brightness of the LED remains unchanged between when the turning-on control is performed by the LAN controller and when the turning-on control is performed by the voltage monitoring circuit.

According to another aspect of the present disclosure, an information processing device includes a light-emitting unit, a communication unit, and a control unit. The communication unit communicates with an external apparatus, and turns on and off the light-emitting unit in accordance with a communication status with the external apparatus. The control unit turns on and off the light-emitting unit in accordance with an activation status of the information processing device. Brightness when the light-emitting unit is turned on by the control unit is higher than brightness when the light-emitting unit is turned on by the communication unit.

Further features of the present disclosure will become apparent from the following description of exemplary embodiments (with reference to the attached drawings).

DESCRIPTION OF THE EMBODIMENTS

Hereinafter, embodiments of the present disclosure will be described with reference to the accompanying drawings.

Note that the configurations shown in the following embodiments are merely examples, and the present disclosure is not limited to the illustrated configurations.

First Embodiment

Figure 1:
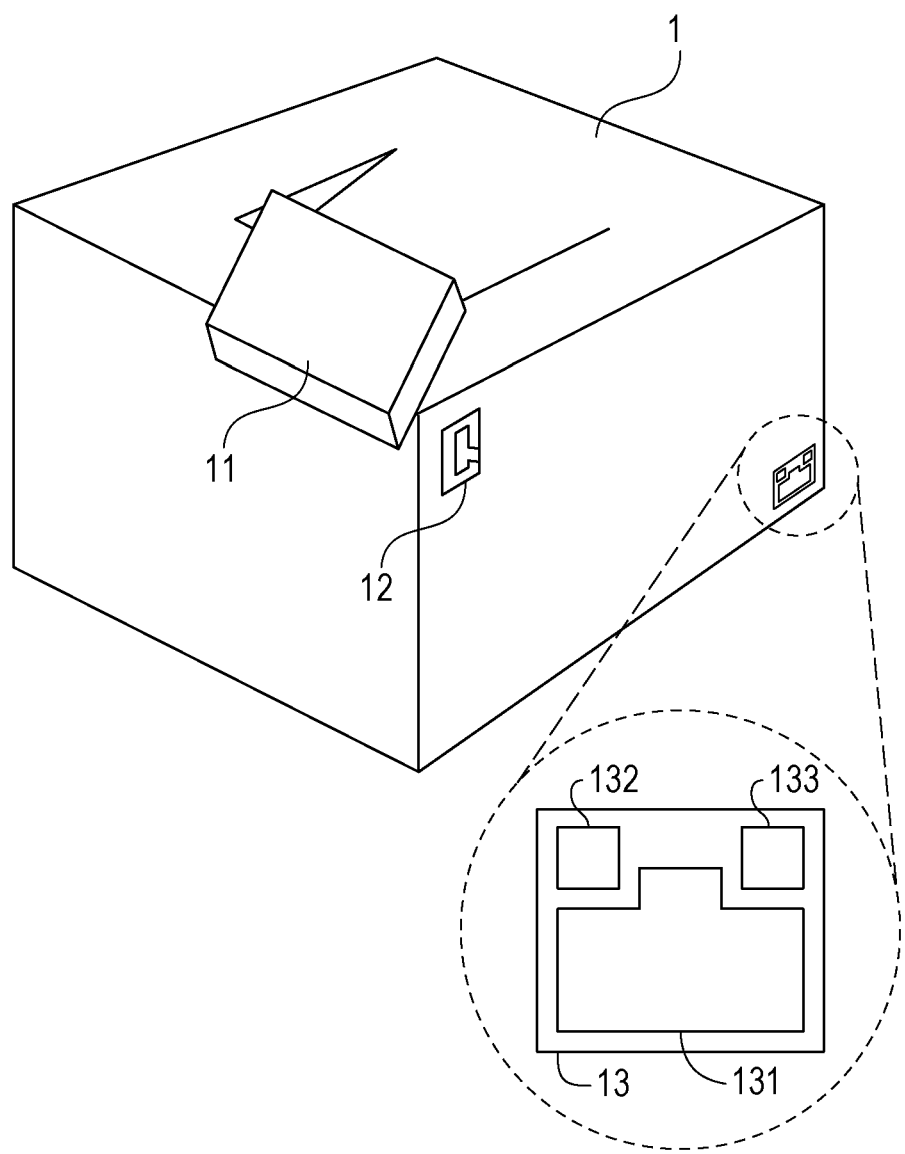
FIG. 1 is a schematic view of the entire display device.

FIG. 1 is a schematic view of the entire information processing device of the present embodiment.

An information processing device 1 is made up of a display 11, a power switch 12, and a LAN connector 13. Note that the information processing device 1 of the present embodiment may be a printing device having a printing function or a scanning device having a document scanning function, and is not limited to a specific type of device. When the information processing device 1 is the printing device having a printing function, the information processing device 1 includes a printer engine that prints an image of print data received from a network external to the printing device by a LAN controller 206 to be described later. When the information processing device 1 is a scanning device having a document scanning function, the information processing device 1 includes a scanner for scanning a document, and an image of the document read by the scanner is transmitted to a network external to the scanning device by the LAN controller 206.

The display 11 has a function of displaying graphic data and the like of the information processing device 1. In addition, the display 11 may have a function of a user selecting a display object to be displayed on the information processing device 1, such as a touch panel or a button.

The power switch 12 controls the power supply state of the information processing device 1. When the power switch 12 is in a conductive state (on-state), power is supplied to the information processing device 1. When the power switch 12 is in the insulating state (off-state), power is not supplied to the information processing device 1.

The LAN connector 13 is used for communication with the outside of the information processing device 1 by connecting a LAN cable (communication cable). The LAN connector 13 has a LAN cable connection 131 and notifying LEDs 132 and 133 for providing notification of the present communication state or the like when the LAN cable is connected. One end of the LAN cable is connected to the LAN cable connection 131, and the other end thereof is connected to an external apparatus (e.g., a hub). The information processing device 1 has a LAN controller 206 to be described later, and the LAN controller 206 transmits and receives data to and from the external apparatus via a LAN cable. That is, a LAN cable transmits data between the two devices.

Figure 2:
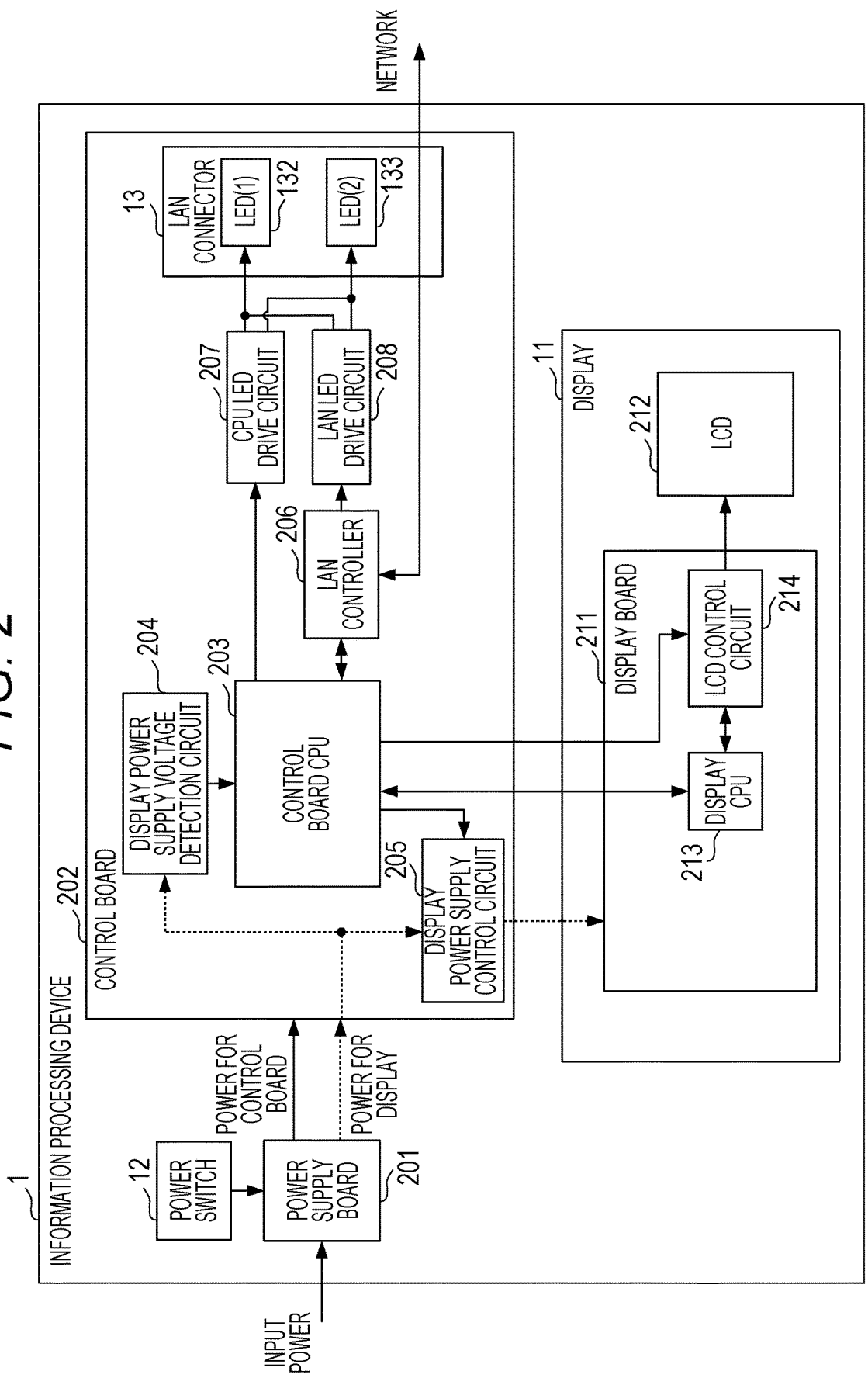
FIG. 2 is a block diagram illustrating an example of a hardware configuration of a display device according to a first embodiment.

FIG. 2 is a block diagram illustrating an example of a hardware configuration of the information processing device 1. The information processing device 1 is made up of a power supply board 201 and a control board 202 in addition to the display 11, the power switch 12, and the LAN connector 13.

The power supply board 201 is connected to an external power supply (e.g., AC 100 V), the power switch 12, and the control board 202. When the power switch 12 comes into the on-state, the power supply board 201 generates a power supply voltage required for operation of the control board 202 (e.g., 5 VDC) and a power supply voltage required for operation of the display 11 (e.g., 24 VDC), and supplies the generated power supply voltages to the control board 202. That is, the power supply board 201 functions as a unit that supplies power of a different voltage to each of the control board 202 and the display 11. Note that the power supply board 201 supplies the power of the different voltage to each part in a predetermined order. For example, after starting the supply of the 5-VDC power to the control board 202, the power supply board 201 starts the supply of 24-VDC power to the display 11.

The control board 202 has a function of communicating with an external device by using the LAN connector 13, and a function of controlling power supply to the display 11 while generating image data to be displayed on the display 11 and transmitting the generated image data to the display 11. The control board 202 is made up of a control board central processing unit (CPU) 203 (hereinafter, referred to as CPU 203), a display power supply voltage detection circuit 204, a display power supply control circuit 205, a LAN controller 206, a CPU LED drive circuit 207, a LAN LED drive circuit 208, and the LAN connector 13.

The control board CPU 203 is a central processing unit that controls the entire information processing device 1. The control board CPU 203 is connected to a display power supply voltage detection circuit 204, a display power supply control circuit 205, a LAN controller 206, a CPU LED drive circuit 207, a display CPU 213, and an LCD control circuit 214, which will be described later.

The display power supply voltage detection circuit 204 is a circuit that detects whether a power supply voltage required for the operation of the display 11 is supplied from the power supply board 201 and notifies the control board CPU 203 of the result of the detection.

The display power supply control circuit 205 is a circuit that controls whether or not to supply the display 11 with the power generated by the power supply board 201 and required for the display 11 based on a signal received from the control board CPU 203. The display power supply control circuit 205 is mounted by a circuit using, for example, a field effect transistor (FET).

The LAN controller 206 performs network communication with the external device via the LAN connector 13. Further, the LAN controller 206 make a setting required for the network communication based on the control signal received from the control board CPU 203, and communicates the result of the network communication to the control board CPU 203. In addition, the LAN controller 206 displays the state of the network communication on the LEDs 132 and 133 by using the LAN LED drive circuit 208 to be described later.

The CPU LED drive circuit 207 is a circuit for turning on or off the LEDs 132 and 133 in accordance with the LED control signal received from the control board CPU 203.

Further, the LED control signals for individually controlling the turning on or off of the LEDs 132 and 133 are made up of two signals, a control signal for the LED 132 and a control signal for the LED 133.

The control signals are configured so that the power is supplied to the control board 202, and the LED 132 is turned on and the LED 133 is turned off while the control board CPU 203 does not transmit the control signal to the CPU LED drive circuit 207. A specific configuration example will be described later with reference to FIG. 3.

The LAN LED drive circuit 208 turns on and off the LEDs 132 and 133 in accordance with the control signal for the LED 132 and the control signal for the LED 133 received from the LAN controller 206.

The display 11 includes a display board 211 and a liquid crystal display (hereinafter, LCD) 212. The display 11 functions as a unit that notifies the user or a service engineer of information such as an abnormal location by displaying an image on the LCD 212.

The display board 211 has a function of converting the power supplied from the control board 202 and the image data received from the control board CPU 203 into a drawing signal that can be drawn by the LCD 212, and transmitting the drawing signal to the LCD 212. The display board 211 is made up of the display CPU 213 and the LCD control circuit 214. The display CPU 213 sets the display CPU 213 itself and a later-described LCD control circuit 214 in accordance with the command received from the control board CPU 203, and transmits the state of the display board 211 to the control hoard CPU 203 as a command. The LCD control circuit 214 converts the image data received from the control board CPU 203 into a drawing signal that enables the LCD 212 to draw. The display CPU 213 controls the LCD control circuit 214 so as to display an image on the LCD 212.

The LCD 212 displays an image in accordance with the drawing signal received from the display board 211.

Figure 3:
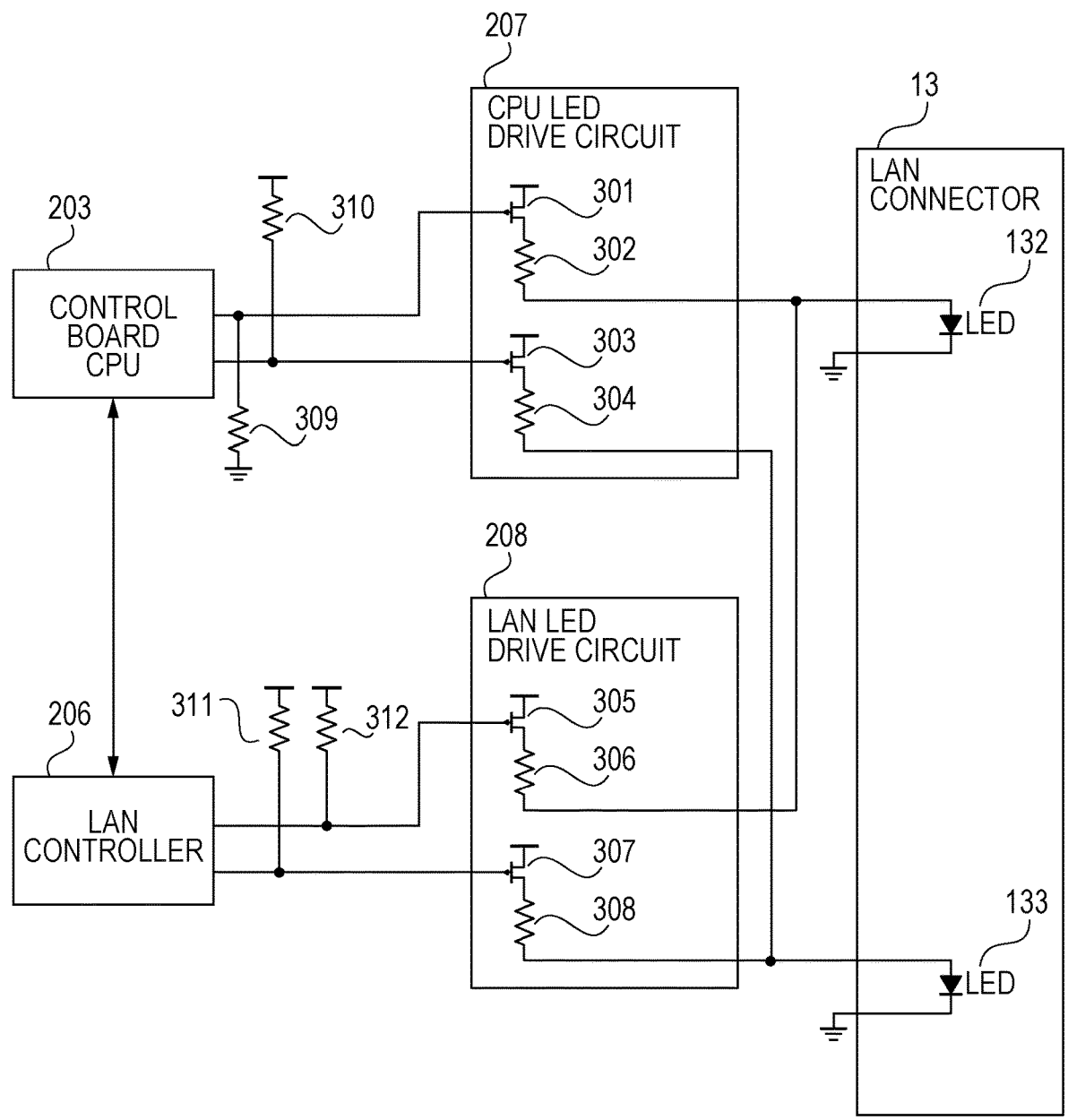
FIG. 3 is a diagram illustrating an electric circuit configuration of an LED drive circuit and a LAN LED drive circuit.

FIG. 3 is an example of a schematic diagram in a case where the CPU LED drive circuit 207 and the LAN LED drive circuit 208 of FIG. 2 are mounted on an electric circuit.

An LED control signal for the control board CPU 203 to control light emission (turning on and off) of the LED 132 is connected (input) to a gate terminal of a P-channel FET 301 in the CPU LED drive circuit 207.

An LED control signal for the control board CPU 203 to control light emission (turning on and off) of the LED 133 is connected (input) to a gate terminal of a P-channel FET 303 in the CPU LED drive circuit 207.

An LED control signal for the LAN controller 206 to control the light emission (turning on and off) of the LED 132 is connected (input) to a gate terminal of a P-channel FET 305 in the LAN LED drive circuit 208.

The LED control signal for the LAN controller 206 to central the light emission (turning on and off) of the LED 133 is connected (input) to the gate terminal of the P-channel FET 307 in the LAN LED drive circuit 208.

When the potential of the control signal connected to the gate terminal of each of the P-channel FETs 301, 303, 305, and 307 is in a state close to the ground (GND) voltage (hereinafter referred to as "low level"), current flows through the LED 132 or 133, and the LED 132 or 133 is turned on.

On the other hand, when the potential of the control signal connected to the gate terminal of each of the P-channel FETs 301, 303, 305, and 307 is in a state close to the power supply voltage (hereinafter referred to as "high level"), current does not flow through the LED 132 or 133, and the LED 132 or 133 is turned off.

Resistors 302, 304, 306, and 308 are used to limit the amount of current flowing to the LED 132 or 133.

The current values are determined based on the brightness required at the time of the light emission of the LEDs 132 and 133, and the resistance values of the resistors 302, 304, 306, and 308 are determined so that the determined current values are satisfied. When the control board CPU 203 performs the turning-on control, it is desirable that the LEDs 132 and 133 be brightened to increase the user's visibility of the turning-on states of the LEDs 132 and 133. On the other hand, when the LAN controller 206 performs the turning-on control, it is desirable that the current values of the LEDs 132 and 133 be made smaller to reduce the overall power consumption of the display device 1. That is, when the LAN controller 206 performs the turning-on control, it is desirable that the LEDs 132 and 133 be darkened. Therefore, the values of the current flowing through the LEDs 132 and 133 are set to be larger when the control board CPU 203 performs the turning-on control than when the LAN controller 206 performs the turning-on control. For achieving this, in the present embodiment, the resistors 302 and 304 are set to have values smaller than those of the resistors 306 and 308. This is one of the features of the present embodiment. By determining the resistance values in this manner, the brightness of each of the LEDs 132 and 133 is higher when the control board CPU 203 turns on the LEDs 132 and 133 in accordance with the activation status of the information processing device 1 than when the LAN controller 206 turns on the LEDs 132 and 133 in accordance with the communication status.

The LED 132 and the LED 133 are semiconductors having different emission colors, and have different brightness and different forward voltage to be applied to the LED when current having the same value flows. It is thus necessary to determine different resistance values for the resistors 302 and 306 and the resistors 302 and 308 so as to cause the LEDs 132 and 133 to emit light with the same brightness. For example, it is assumed that the resistance values of the resistors 302, 304, 306, and 308 are 360 Ω, 300 Ω, 1.3 kΩ, and 1.1 kΩ, respectively. In this case, the LED 132 allows a current of about 3.5 mA to flow when the control board CPU 203 performs the turning-on control and emits light, and, the LED 132 allows a current of about 1.1 mA to flow when the LAN controller 206 performs the turning-on control and emits light. On the other hand, the LED 133 allows a current of about 3.9 mA to flow when the control board CPU 203 performs the turning-on control and emits light, and, the LED 133 allows a current of about 1.2 mA to flow when the LAN controller 206 performs the turning-on control and emits light. By setting the resistance values of the resistors 302, 304, 306, and 308 to different values, the brightness of the LEDs 132 and 133 can be controlled appropriately.

In the present embodiment, the P-channel FET has been used as a switch for the turning-on control for the LEDs 132 and 133, but a switch may be configured using one or more transistors, semiconductor integrated circuits (ICs), or the like. In the present embodiment, the value of the current flowing through the LED 132 or 133 is limited by the resistors 302, 304, 306, and 308, but a current limiting circuit configured using a semiconductor or the like may be used. In the present embodiment, the CPU LED drive circuit 207 and the LAN LED drive circuit 208 have been provided on the upstream sides of the LEDs 132 and 133, but may be provided on the downstream sides.

Since the LED 132 is connected to both the CPU LED drive circuit 207 and the LED drive circuit 208, when either one performs the turning-on control, the LED 132 is turned on. When both the CPU LED drive circuit 207 and the LED drive circuit 208 perform the turning-off control, the LED 132 is turned off.

Similarly, since the LED 133 is also connected to both the CPU LED drive circuit 207 and the LED drive circuit 208, when either one performs the turning-on control, the LED 133 is turned on. When both the CPU LED drive circuit 207 and the LED drive circuit 208 perform the turning-off control, the LED 133 is turned off.

For the two control signals from the control board CPU 203 to the CPU LED drive circuit 207, the resistor 309 for defining the initial state of the signal at the power-on is connected to GND, and each of the resistors 310, 311, and 312 is connected to the power supply. That is, the resistor 309 is a pull-down resistor, and the resistors 310, 311, and 312 are pull-up resistors.

When the power is supplied to the control board 202 and both the control board CPU 203 and the LAN controller 206 transmit no control signal to the CPU LED drive circuits 207 and 208, the terminals of the control board CPU 203 and the LAN controller 206 come into a high impedance state. Accordingly, the gate terminal of the FET 301 shifts to the low level with the resistor 309, and the FET 301 is turned on, so that the LED 132 is turned on.

When the power is supplied to the control board 202, and both the control board CPU 203 and the LAN controller 206 transmit no control signal to the CPU LED drive circuits 207 and 208, the terminals of the control board. CPU 203 and the LAN controller 206 come into the high impedance state. The gate terminal of the FET 303 shifts to the high level with the resistor 310 and the FET 303 is turned off, while the gate terminal of the FET 307 becomes the high level with the resistor 311 and the FET 307 is turned off, so that the LED 133 is turned off.

In the present embodiment, the resistors 309 and 310 have been mounted between the control board CPU 203 and the CPU LED drive circuit 207, but the resistors 309 and 310 may be mounted inside the CPU LED drive circuit 207. The resistors 309 and 310 may be mounted in the control board CPU 203 as internal resistors that are present without depending on the port control performed by the control board CPU 203.

Similarly, the resistors 311 and 312 may be mounted in the LAN LED drive circuit 208, or may be mounted in the LAN controller 206 as internal resistors that are present without depending on the port control performed by the LAN controller 206.

Figure 4A:
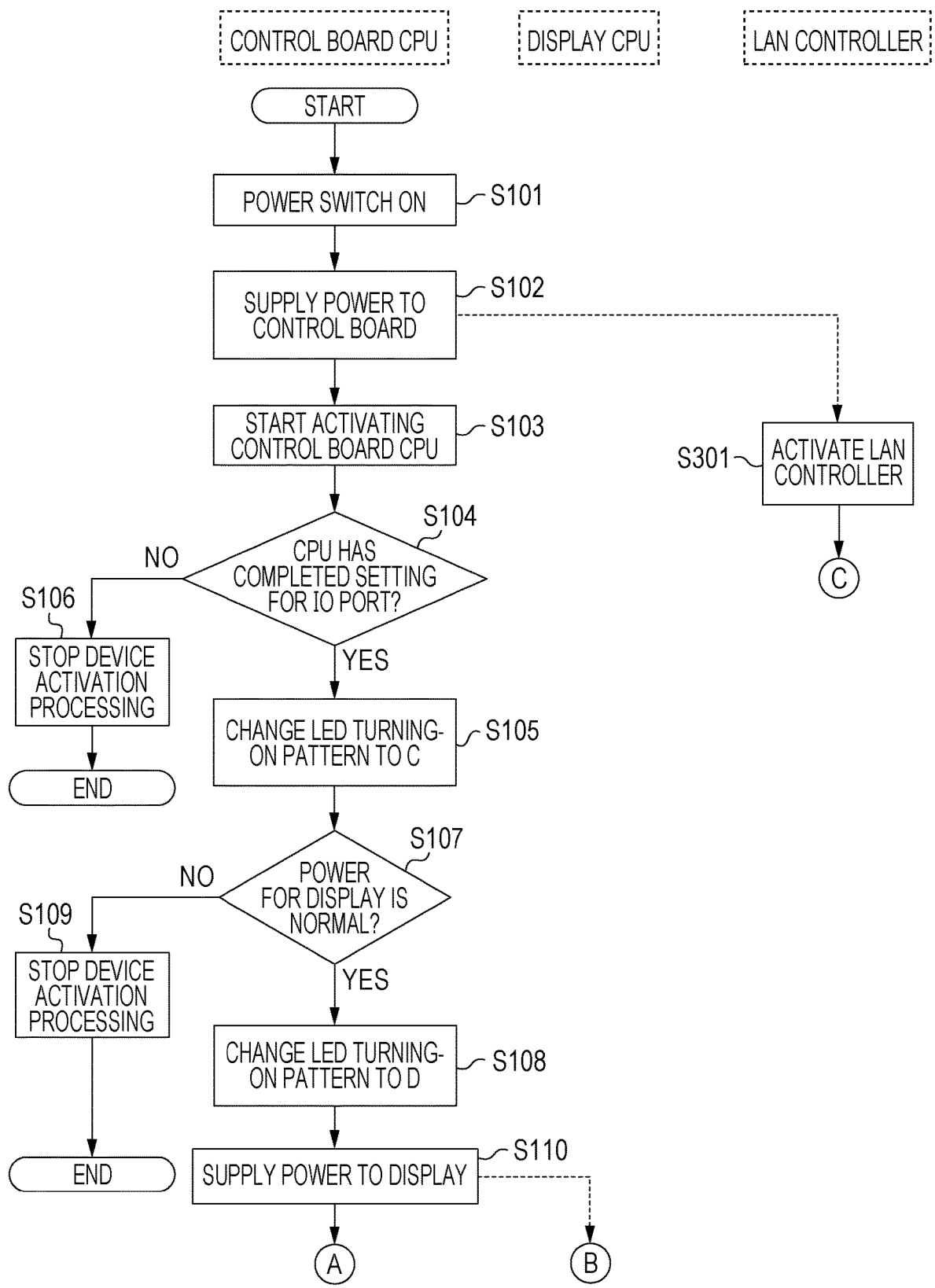
FIGS. 4A and 4B are diagrams illustrating a control or according to the first embodiment.
Figure 4B:
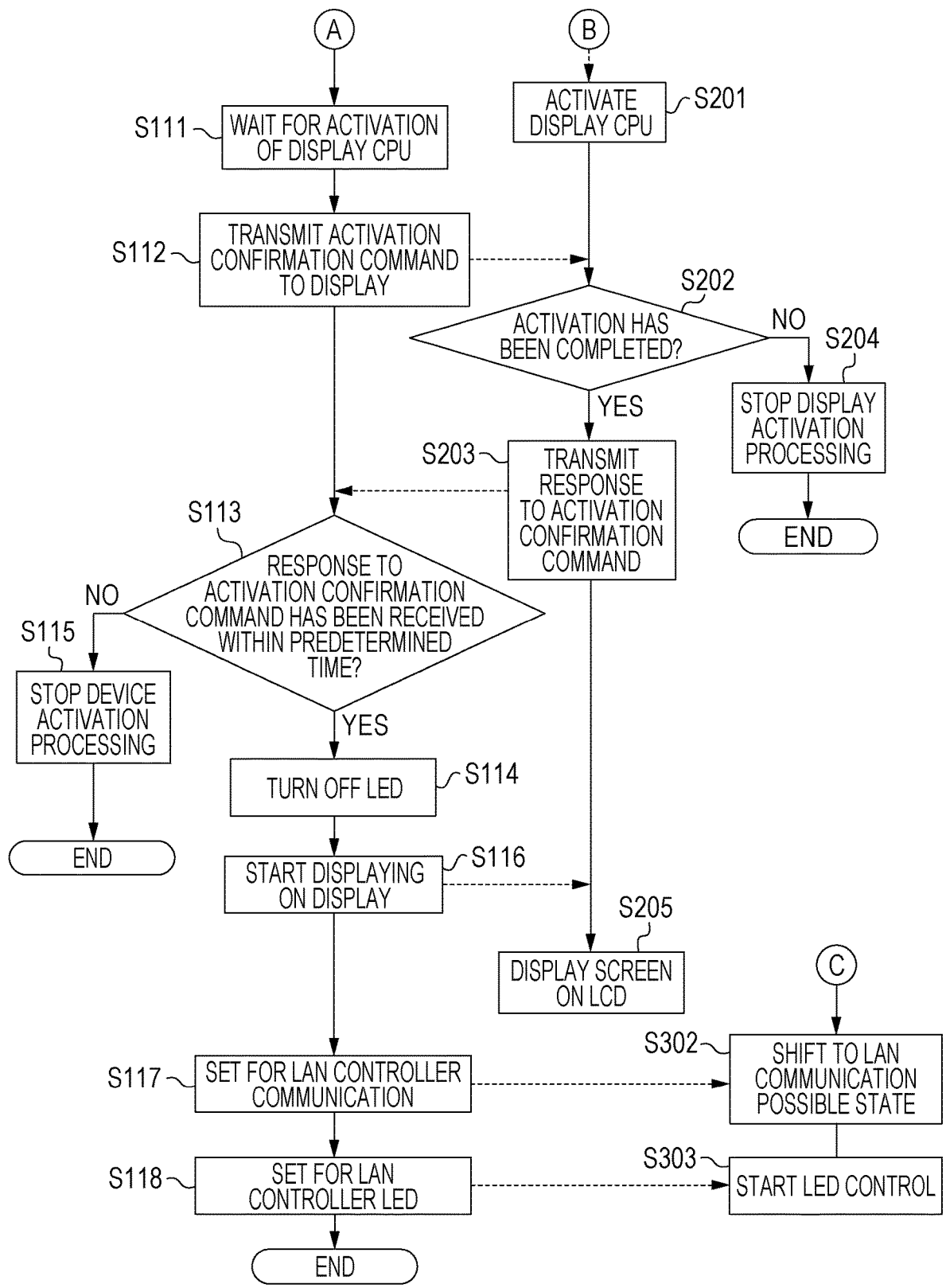

FIGS. 4A and 4B are flowcharts representing an activation sequence of the information processing device 1. In this activation sequence, the control board CPU 203 in the control board 202 executes a program. In the present embodiment, this program includes a boot program that is executed first by the control board CPU 203 after the reset state is released. The boot program causes the control board CPU 203 to execute a series of processing of activating the information processing device 1. That is, the boot program makes a setting so that a plurality of input/output ports of the control board CPU 203 can be used. The boot program activates the display CPU 213 so that the display CPU 213 can display information such as images and texts on the LCD 212. Further, the boot program sets the LAN controller 206 so that the LAN controller 206 can communicate with the external apparatus and control the turning on and off of the LEDs 132 and 133.

As one of the features of the present embodiment, until the boot program activates the display CPU 213 so that the display 11 can display information, the LEDs 132 and 133 are turned on and off in accordance with the execution status of the boot program (the progress status of a series of processing). The execution status of the boot program is included in the activation status of the information processing device 1 (the progress status of the activation processing).

In accordance with such a boot program, the control board CPU 203 performs each processing illustrated in the flowchart of FIGS. 4A and 4B.

When the power switch 12 is turned on (S101), the power supply board 201 supplies power (5 V power and 24 V power in the present embodiment) to the control board 202 (S102).

Figure 5:
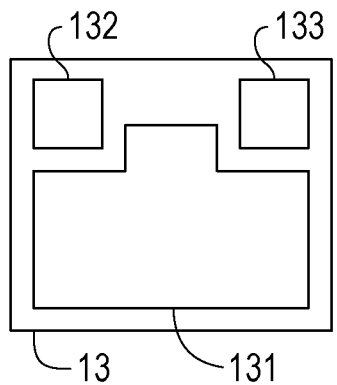
FIG. 5 is a diagram illustrating turning-on patterns of LEDs.
Figure 5:
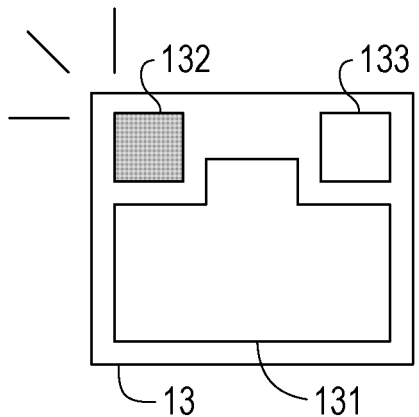
Figure 5:
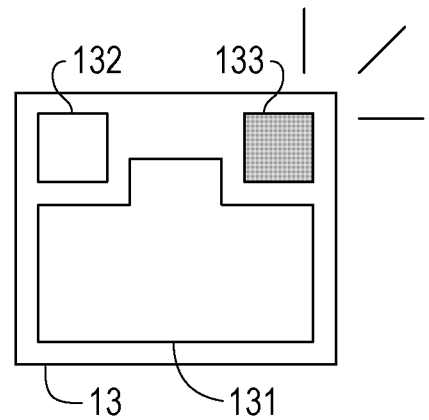
Figure 5:
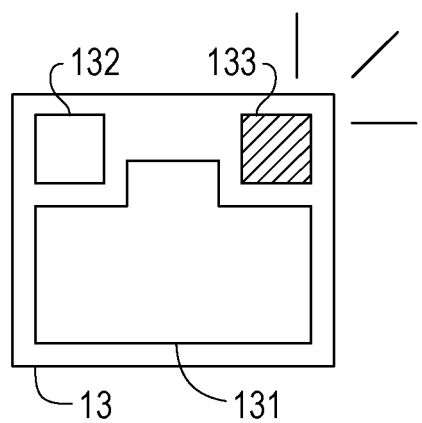

Before the turning on of the power switch 12, both the LED 132 and the LED 133 are in the turning-off state (FIG. 5, LED turning-on pattern A).

The control board CPU 203, to which power (electric power) is being supplied, reads a boot program from a nonvolatile memory (not illustrated) and starts the activation (S103). At this time, the boot program has not been executed yet, and the LED 132 is turned on without control of the control board CPU 203 as described above. That is, the LED turning-on pattern is a LED turning-on pattern B in FIG. 5.

When there is no display on the display 11 even though the power switch 12 is turned on, and when both the LED 132 and the LED 133 of the LAN connector 13 are in the "turning-off state", it is conceivable that the information processing device 1 is in the following state. This is a state in which the power is not being supplied to the control board 202. Therefore, when the device is being stopped with both the LEDs 132 and 133 turned off, it is possible to determine that the abnormal location is a power part (the power switch 12, the power supply board 201, and a bundle for the power).

When the power is supplied to the control board 202, the power is also supplied to the LAN controller 206, and the LAN controller 206 is activated (S301). However, the LAN controller 206 comes into a wait state while being in the initial state until a register in the LAN controller 206 is set by the control board CPU 203, and does not perform LED control or network communication. That is, the LAN controller 206 controls the LEDs 132 and 133 after being set by the control board CPU 203 so that the LAN controller 206 can control the LEDs. The LAN controller 206 can communicate with the external apparatus after being set by the control board CPU 203 so that the LAN controller 206 can communicate with the external apparatus.

Immediately after the activation of the LAN controller 206, the terminal of the LED control signal of the LAN controller 206 connected to the LAN LED drive circuit 208 comes into the high impedance state.

When the control board CPU 203 completes reading the boot program, the control board CPU 203 executes the read boot program. The control board CPU 203 performs setting processing for a plurality of external input/output ports (I/O ports) provided in the control board CPU 203 (S104-Yes). This I/O port is used for the control board CPU 203 to communicate with peripheral devices. The peripheral devices are, for example, the display power supply voltage detection circuit 204, the display power supply control circuit 205, the LAN controller 206, the CPU LED drive circuit 207, the display CPU 213, and the LCD control circuit 214. This setting is to set whether each I/O port is used as an input port or an output port. For example, the control board CPU 203 sets, as the output port, an I/O port to which a signal line of an LED control signal for controlling the turning on and off of the LED 132 is connected. Further, the control board CPU 203 sets, as the output port, an I/O port to which a signal line of an LED control signal of the LED 133 is connected. Moreover, the control board CPU 203 sets, as the output port, an I/O port to which a signal line of a reset control signal for controlling resetting and reset releasing of the LAN controller 206 is connected. Then, the control board CPU 203 controls the output level of the reset control signal, which is output from this output port, to bring the LAN controller 206 into a reset state. The control board CPU 203 also sets a communication control signal to the LAN controller 206.

Then, after this setting, the control board CPU 203 controls the output level of the LED control signal to change the LED turning-on pattern from the LED turning-on pattern B to an LED turning-on pattern C in FIG. 5. In the present embodiment, the LED control signal of the LED 132 is controlled to "high level" to turn off the LED 132, and the LED control signal of the LED 133 is controlled to "low level" to turn on the LED 133 (S105).

When the control board CPU 203 cannot execute the activation processing up to the setting of the I/O port for some reason (e.g., abnormal reading of the program) (S104-No), the device stops in that state (S106). That is, the turning-on pattern of the LED remains the LED turning-on pattern B in FIG. 5. When there is no display on the display 11 even though the power switch 12 is turned on, and when the LED 132 of the LAN connector 13 is in the "turning-on state" and the LED 133 of the LAN connector 13 is in the "turning-off state" (when the turning-on pattern remains the turning-on pattern B), it is conceivable that the information processing device 1 is in the following state. Although the power is being supplied to the control board 202, the control board CPU 203 cannot be activated due to an abnormality on the control board 202 (a failure of the control board CPU 203, a failure of a board element, an abnormality of board wiring, etc.). Therefore, when the device is being stopped while the turning-on pattern B is held, it is possible to determine that the abnormal location is the control board 202.

Subsequently, the control board CPU 203 determines whether or not the power supply voltage (24 V in the embodiment) supplied to the display 11 is normal by confirming the level of the signal from the display power supply voltage detection circuit 204 (S107).

When it is determined that the power supply voltage supplied to the display 11 is normal (S107-Yes), the control board CPU 203 controls the output level of the LED control signal to change the LED turning-on pattern from the LED turning-on pattern C to an LED turning-on pattern D in FIG. 5 (S108). In the present embodiment, the control board CPU 203 controls the LED control signal of the LED 132 to "high level" to turn off the LED 132. Then, the control board CPU 203 performs control to repeatedly switch "high level" and "low level" of the LED control signal of the LED 133 every one second to make the LED 133 blink.

On the other hand, when it is determined that there is an abnormality in the power supply voltage supplied to the display 11 (S107-No), the control board CPU 203 stops the device activation processing (S109). That is, the LED turning-on pattern remains the LED turning-on pattern. C in FIG. 5. When there is no display on the display 11 even though the power switch 12 is turned on, and when the LED 132 of the LAN connector 13 is in the "turning-off state" and the LED 133 of the LAN connector 13 is in the "turning-on state", it is conceivable that the information processing device 1 is in the following state. That is a state where, a power for the control board (for the control board CPU 203, the LAN controller, and the LAN connector 13) is correctly supplied to the control board 202, but a power supplied to the display 11 is abnormal. Therefore, when the device is being stopped while the turning-on pattern C is held, it is possible to determine that the abnormal location is a power supply part tier the display 11 (the power supply board 201 and a bundle for the power).

After confirming that there is no abnormality in the power supplied to the display 11, the control board CPU 203 outputs a control signal for supplying power to the display 11 to the display power supply control circuit 205 (S110). When the power is supplied to the display 11, the display CPU 213 starts to be activated (S201). As described above, the control board CPU 203 activates the display CPU 213.

The control board CPU 203 waits for a sufficient time (200 ms in the present embodiment) for the display CPU 213 to complete the activation (S111), and then transmits an activation confirmation command to the display CPU 213 (S112).

The display CPU 213, having received the activation confirmation command, transmits a response to the activation confirmation command to the control board CPU 203 when the activation processing of the display CPU 213 has been completed correctly (S202-Yes) (S203). The response to the activation confirmation command corresponds to a signal indicating that the activation of the display CPU 213 has been completed.

When the display CPU 213 cannot be activated normally due to a power abnormality in the display, a failure of the display CPU 213, or the like, the response to the activation confirmation command is not transmitted, and the activation of the display 11 is stopped (S202-No).

The control board CPU 203 determines whether or not the response to the activation confirmation command has been received from the display CPU 213 within a predetermined time (within 10 ms in the present embodiment) after transmitting the activation confirmation command to the display CPU 213.

When the response to the activation confirmation command is received from the display CPU 213 within the predetermined time (S113-Yes), the control board CPU 203 controls the output level of the LED control signal to bring the LED 132 and the LED 133 into the turning-off state. That is, the control board CPU 203 controls the LED control signal of the LED 132 to "high level" to turn off the LED 132, and the LED control signal of the LED 133 to "high level" to turn off the LED 133 (S114).

When the predetermined time has elapsed while the response to the activation confirmation command is not received (S113-No), the device stops in that state (S115). That is, the LED turning-on pattern remains the LED turning-on pattern D in FIG. 5. When there is no display on the display 11 even though the power switch 12 is turned on, and when the LED 132 of the LAN connector 13 is in the "turning-off state" and the LED 133 of the LAN connector 13 is in the "blinking state", it is conceivable that the information processing device 1 is in the following state. The control board CPU 203 is operating normally and the power for the display is being supplied, but the display 11 is not operating. Therefore, when the device is being stopped while the turning-on pattern D is held, it is possible to determine that this is an abnormality with the abnormal location being a transmission part between the control board 202 and the display 11 or in the display 11.

The control board CPU 203 transmits image data to the LCD control circuit 214 of the display 11 (S116), and the LCD control circuit 214, having received the image data, causes the LCD 212 to display a screen in accordance with the received image data (S205).

Thereafter, when an abnormality of the device is detected, information indicating an abnormal location is displayed using the LCD 212 of the display 11, while an abnormality is not displayed using the LED 132 and the LED 133.

The control board CPU 203 controls the reset control signal of the LAN controller 206 to bring the reset control signal into a reset released state. Then, the control board CPU 203 rewrites a register setting value for determining an operation mode and the like of the LAN controller 206 inside the LAN controller 206 via a communication line to the LAN controller 206. The control board CPU 203 makes a setting for starting external network communication via the communication line to the LAN controller 206 (S117). The LAN controller 206 set to be able to communicate with the external apparatus by the control board CPU 203 starts communication with an external network via the LAN connector 13 (S302).

Subsequently, the control board CPU 203 makes a setting for LED control of the LAN controller 206 via the communication line (S118). The LAN controller 206 set to be able to control the turning on and off of the LEDs 132 and 133 by the control board CPU 203 performs the turning-on control on the LED 132 and the LED 133 in accordance with the network communication status (operation status) (S303). The turning-on control on the LEDs 132 and 133 by the LAN controller 206 is performed by the LAN controller 206 outputting an LED control signal to the LAN LED drive circuit 208.

Thereafter, the LED 132 and the LED 133 are caused to be turned on and off by the LAN controller 206 in accordance with the communication status of the network, and the control board CPU 203 does not control the turning on and off.

In this configuration, the LED of the LAN connector 13 is used for the abnormality display as described above.

Hence it is not necessary to provide an LED dedicated to abnormality display, and the function is realized while a cost increase is prevented.

The notification of the network communication status, which is the original role of the LED of the LAN connector 13, cannot be performed from the time when the power switch 12 is turned on until the display on the display 11 is started, but can be performed after the display 11 can be displayed when the device is activated.

By taking the control and configuration as described above, a cost increase can be prevented, and the abnormal location can be indicated to the user even when an abnormality occurs between the time of turning on of the power switch 12 and the time of display on the display 11, without limiting the functions in actual use. Therefore, it is possible to prompt a correct return processing.

Second Embodiment

In FIG. 3, the values of the current flowing through the LEDs 132 and 133 have been controlled by the resistors 302, 304, 306, and 308. In the present embodiment, by switching the magnitude of the power supply voltage of the drive circuit for the LEDs 132 and 133, the values of the current flowing through the LEDs 132 and 133 are made larger when the control board CPU 203 performs the turning-on control than when the LAN controller 206 performs the turning-on control. Specifically, the power supply voltages of the drive circuits for the LEDs 132 and 133 are made higher when the turning-on control is performed by the control board CPU 203 than when the turning-on control is performed by the LAN controller 206. By such a method as well, the brightness of the LED can be made higher when the control board CPU 203 turns on LED in accordance with the activation status of the information processing device 1 than when the LAN controller 206 turns on the LED in accordance with the communication status.

Figure 6:
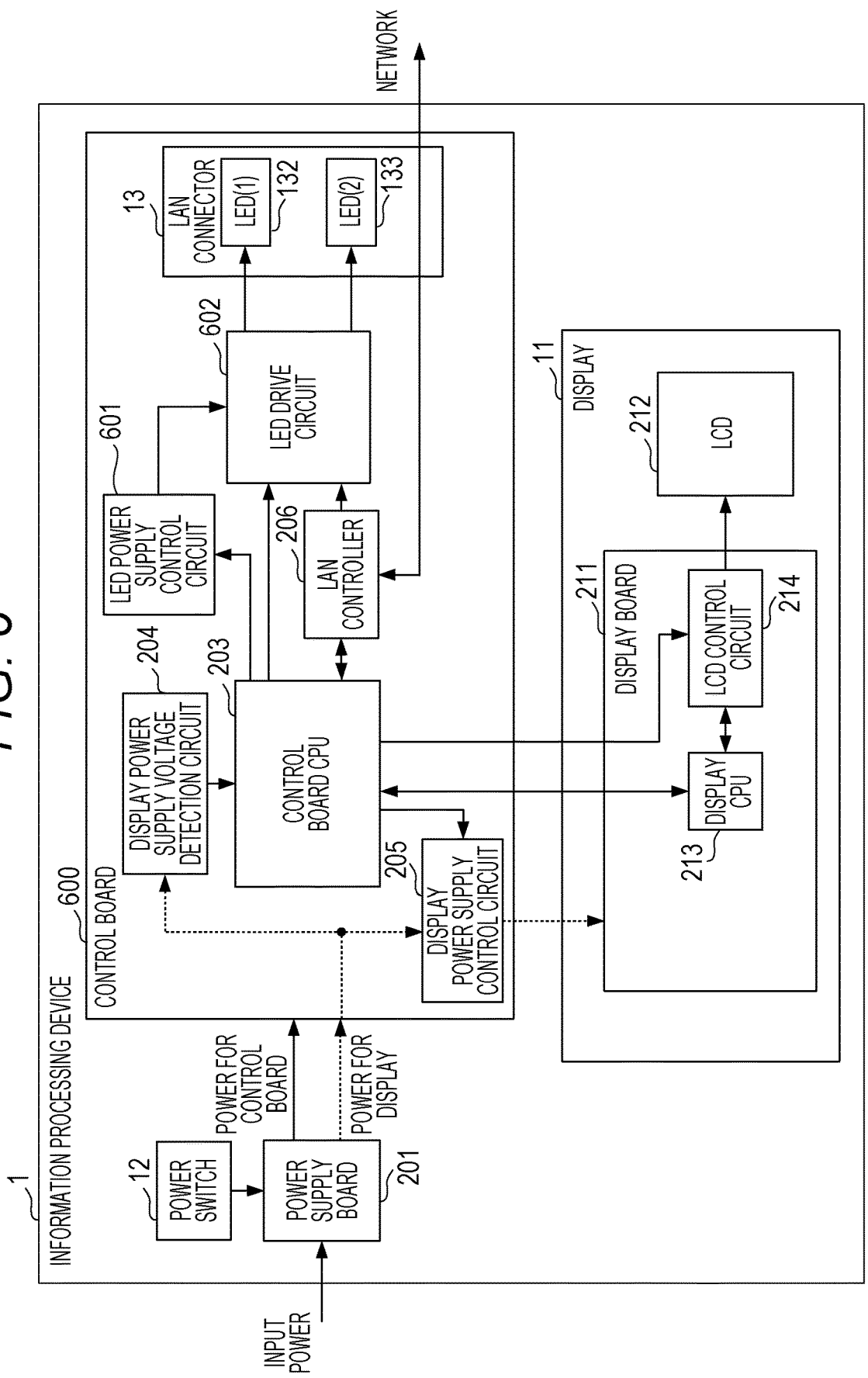
FIG. 6 is a block diagram illustrating an example of a hardware configuration of a display device according to a second embodiment.

FIG. 6 is a block diagram illustrating an example of a hardware configuration of the display device 1 in the present embodiment.

Like the control board 202, a control board 600 has a function of communicating with an external device by using the LAN connector 13, and a function of controlling power supply to the display 11 while generating image data to be displayed on the display 11 and transmitting the generated image data to the display 11. Like the control board 202, the control board 600 includes a control board CPU 203, a display power supply voltage detection circuit 204, a display power supply control circuit 205, a LAN controller 206, and the LAN connector 13. However, the control board 600 does not include the CPU LED drive circuit 207 or the LAN LED drive circuit 208, but includes an LED power supply control circuit 601 and an LED drive circuit 602 instead.

An LED power supply control circuit 601 changes (switches) the power supply voltage to be supplied to an LED drive circuit 602 based on a signal 712 received from the control board CPU 203. When the power is supplied to the control board 600, the LED power supply control circuit 601 supplies a power supply voltage (e.g., 3.3 V) required for the control board CPU 203 to perform the turning-on control on the LEDs 132 and 133. Thereafter, upon receipt of the control signal 712 from the control board CPU 203, the LAN controller 206 supplies a power supply voltage (e.g., 2.5 V) that is required at the time of controlling the turning on of the LEDs 132 and 133. This LED power supply control circuit functions as a voltage control unit that controls the voltage value of the voltage to be supplied to the LED drive circuit 602.

The LED drive circuit 602 is a circuit for turning on or off the LEDs 132 and 133 in accordance with the LED control signals of the LEDs 132 and 133 input from the control board CPU 203 or the LAN controller 206.

Figure 7:
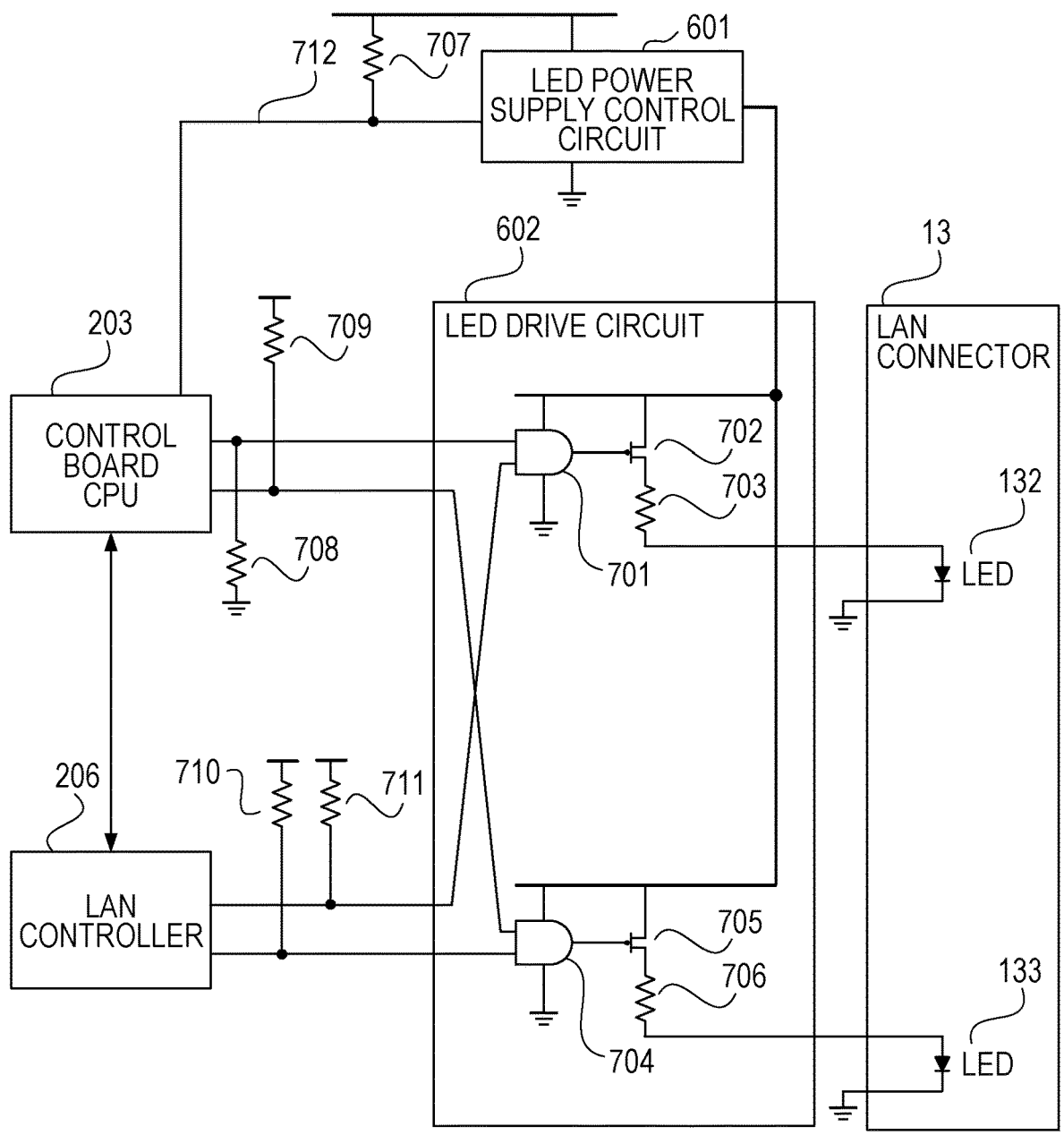
FIG. 7 is a diagram illustrating an electric circuit configuration of an LED drive circuit.

FIG. 7 is an example of a schematic diagram in a case where the LED drive circuit 602 and its peripheral circuits in FIG. 6 are mounted on an electric circuit.

An LED control signal for the control board CPU 203 to control the light emission (turning on and off) of the LED 132 is connected (input) to one input terminal of an AND circuit 701.

An LED control signal for the control board CPU 203 to control the light emission (turning on and off) of the LED 133 is connected (input) to one input terminal of an AND circuit 704.

An LED control signal for the LAN controller 206 to control the light emission (turning on and off) of the LED 132 is connected (input) to the other input terminal of the AND circuit 701.

An LED control signal for the LAN controller 206 to control the light emission (turning on and off) of the LED 133 is connected (input) to the other input terminal of the AND circuit 704.

Each of the AND circuits 701 and 704 has two input terminals and one output terminal. As described above, the two input terminals are connected to the control board CPU 203 and the LAN controller 206, respectively. The output terminals of AND circuits 701 and 704 are connected to P-channel FETs 702 and 705, respectively. Therefore, when the control signals input from the control board CPU 203 and the LAN controller 206 are both at the high level, the gate terminal of the P-channel FET 702 or 705 is at the high level. When the gate terminal of the P-channel FET 702 or 705 is at the high level, no current is allowed to flow to the LED 132 or 133, and the LED 132 or 133 is turned off. However, when at least one of the control signals input from the control board CPU 203 and the LAN controller 206 is at the low level, the gate terminal of the P-channel FET 702 or 705 is at the low level. When h gate terminal of the P-channel FET 702 or 705 is at the low level, current is allowed to flow to the LED 132 or 133, and the LED 132 or 133 is turned on. The resistors 703 and 706 are used to limit the amount of current allowed to flow to the LED 132 or 133. The resistance values of the resistors 703 and 706 are 360 Ω and 330Ω, respectively. In the present embodiment, the amount of current flowing through the LEDs 132 and 133 is controlled by switching the magnitude of the power supply voltage of the LEDs 132 and 133. However, in addition to the switching of the magnitude of the power supply voltage, the resistance values of the resistors 703 and 706 may be adjusted to appropriate values. In the present embodiment, the LED power supply control circuit 601 and the LED drive circuit 602 are provided on the upstream side of the LEDs 132 and 133, but the LED power supply control circuit 601 may be provided on the upstream sides of the LEDs 132 and 133, and the LED drive circuit 602 may be provided on the downstream sides. The power of the LED drive circuit 602 is supplied from the LED power supply control circuit 601. The LED power supply control circuit 601 is connected to the LED drive circuit 602 and the control board CPU 203.

A signal line 712 connecting the LED power supply control circuit 601 and the control board CPU 203 is connected with a resistor 707 so that the initial state at the power-on is at the high level. The LED power supply control circuit 601 starts the operation when the power is supplied to the control board 600, and supplies a high voltage (e.g., 33 V) to the LED drive circuit 602 while the control signal 712 input from the control board CPU 203 is at the high level. Accordingly, for example, the LEDs 132 and 133 allow a current of about 3.5 mA to flow.

When the signal 712 input from the control board CPU 203 to the LED power supply control circuit 601 changes to the low level, the LED power supply control circuit 601 supplies a low voltage (e.g., 2.5 V) to the LED drive circuit 602. Accordingly, for example, the LEDs 132 and 133 allow a current of about 1.7 mA to flow.

The control board CPU 203 outputs a high-level signal 712 to the LED power supply control circuit 601 while the control board CPU 203 controls the turning on of the LEDs 132 and 133. Conversely, the control board CPU 203 outputs a low-level signal 712 to the LED power supply control circuit 601 while the LAN controller 206 controls the turning on of the LEDs 132 and 133. Therefore, the values of the current flowing through the LEDs 132 and 133 are larger while the control board CPU 203 performs the turning-on control on the LEDs 132 and 133 than while the LAN controller 206 performs the turning-on control on the LEDs 132 and 133, so that the LEDs 132 and 133 are bright.

In addition, for a total of four signals connected from the control board CPU 203 and the LAN controller 206 to the LED drive circuit 602, the resistor 708 for defining the initial state of the signal at the power-on is connected to GND, and resistors 709, 710, and 711 are connected to the power supply. When the power is turned on, the LED 132 is turned on and the LED 133 is turned off by the resistors 708, 709, 710, and 711.

Although the resistors 708 and 709 are mounted between the control board CPU 203 and the LED drive circuit 602 in the present embodiment, the resistors 708 and 709 may be mounted in the LED drive circuit 602. Alternatively, the resistors 708 and 709 may be mounted in the control board CPU 203 as internal resistors that are present without depending on the port control performed by the control board CPU 203.

Similarly, the resistors 710 and 711 may be mounted in the LED drive circuit 602, or may be mounted in the LAN controller 206 as internal resistors that are present without depending on the port control performed by the LAN controller 206.

Figure 8A:
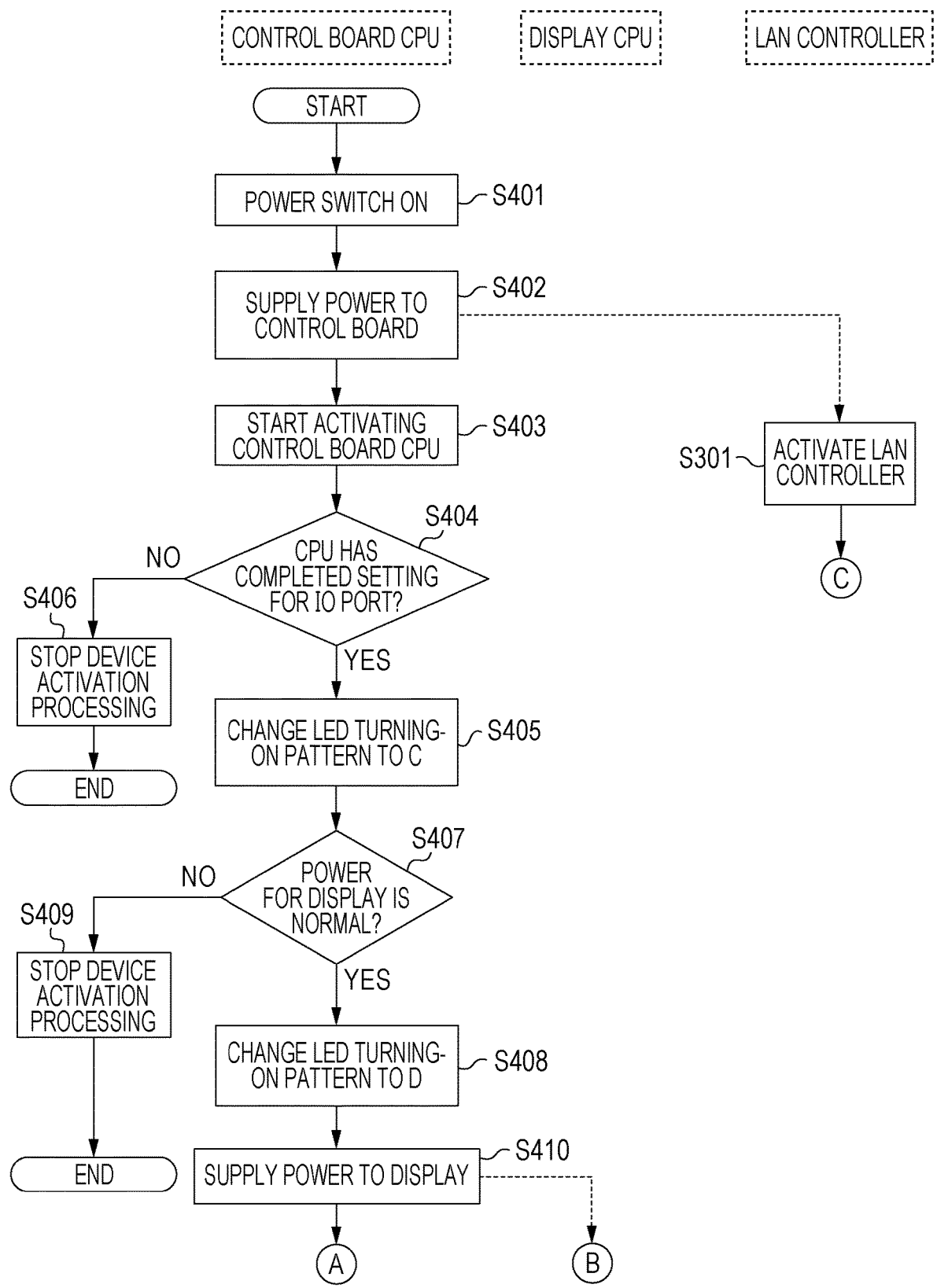
FIGS. 8A and 8B are diagrams illustrating a control flow according to the second embodiment.
Figure 8B:
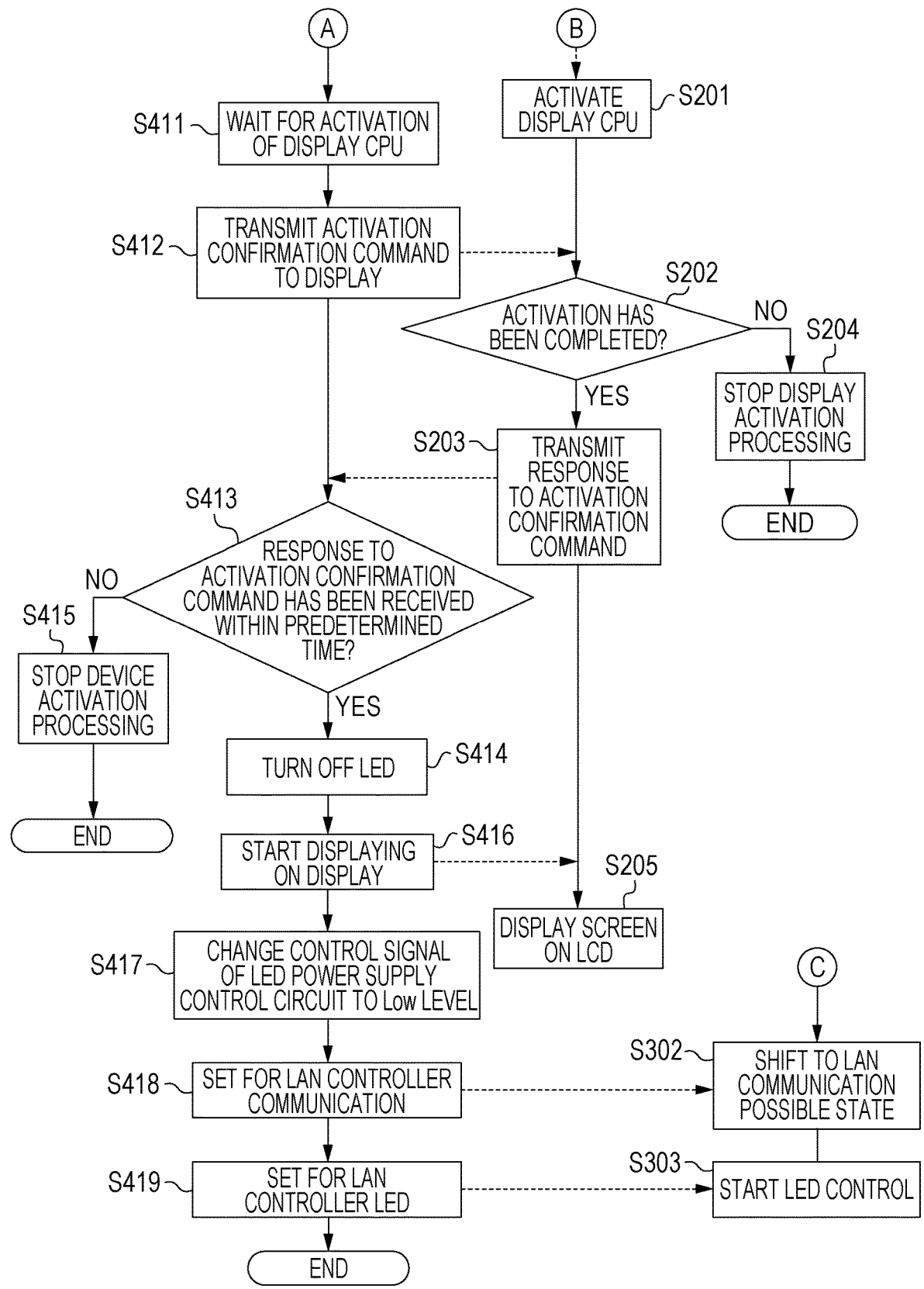

FIGS. 8A and 8B are flowcharts representing an activation sequence of the information processing device 1. In this activation sequence, the control board CPU 203 in the control board 600 executes a program. In the present embodiment, this program includes a boot program that is executed first by the control board CPU 203 after the reset state is released. The control board CPU 203 performs each processing illustrated in the flowchart of FIGS. 8A and 8B in accordance with the boot program.

In the flowchart of the control board CPU 203, the flow from S101 to S116 is the same as the flowchart (S401 to S416) of the present embodiment. However, in S404, the control board CPU 203 also performs setting processing for the I/O port to which the signal 712 is connected.

After the display on the display 11 is started in S416, the control board. CPU 203 changes the control signal 712, which is output to the LED power supply control circuit 601, to the low level (S417).

Thereafter, the control board CPU 203 performs a communication setting for the LAN controller as in S117 (S418). Subsequently, the control board CPU 203 sets the LED control of the LAN controller 206 via the control line as in S118 (S419), The LAN controller having made the LED control setting, controls the LAN LED drive circuit 208, and performs turning-on control on the LED 132 and the LED 133 in accordance with the communication status.

Note that the flowchart of the display CPU 213 (S201 to S205) and the flowchart of the LAN controller 206 (S301 to S303) operate in the same manner as in the first embodiment.

Figure 9:
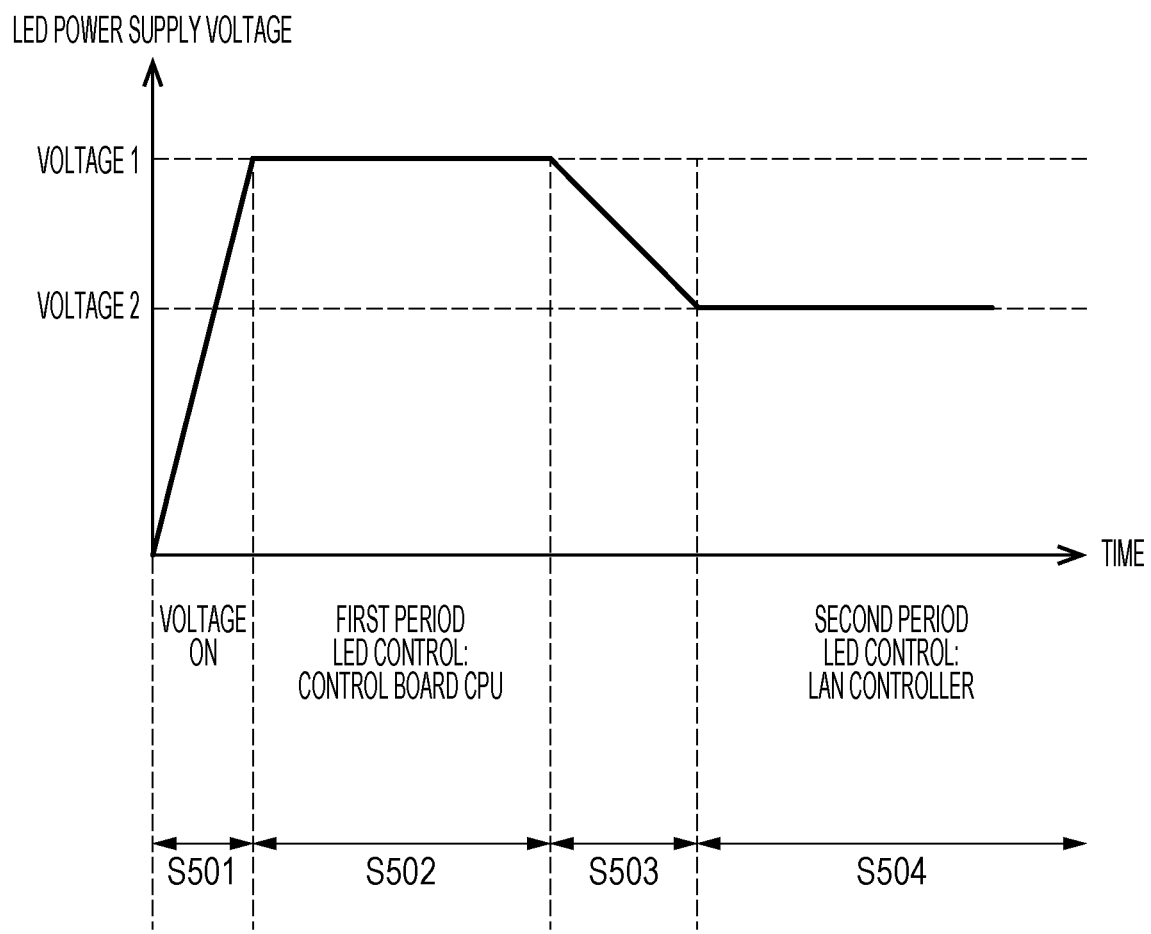
FIG. 9 is the time transition of an LED power supply voltage output by an LED power supply control circuit.

FIG. 9 is a diagram representing a temporal change of a power supply voltage required for the operation of the LED drive circuit 602 and the LAN LED drive circuit 603, output by the LED power supply control circuit 601.

When the power is supplied to the control board 600 in S402, the LED power supply voltage, which is supplied by the LED power supply control circuit 601 to the LED drive circuit 602, increases to a high-state voltage (e.g., 3.3 V) (S501).

After the LED power supply voltage rises to the high-state voltage, the control board CPU 203 controls the LEDs 132 and 133 from S405 to S414 (S502).

When the control signal, which is output from the control board CPU 203 to the LED power supply control circuit, is changed to the low level in S417, the LED power supply voltage falls to a low-state voltage (e.g., 2.5 V) (S503).

After the LED power supply voltage has fallen to the low state voltage, the LAN controller 206 controls the LEDs 132 and 133 in S419 (S504).

In the present embodiment, while the LED power supply voltage is rising (S501) and falling (S503), the LEDs 132 and 133 are in the turning-off state. In order to realize this, a wait time may be provided for the control board CPU 203 and the LAN controller 206 from when the turning on of the LEDs 132 and 133 can be controlled to when the control is actually performed. In addition, although not shown in the present embodiment, a function of monitoring the LED power supply voltage may be added to the control board 600 to determine whether or not to control the LED 132 and the LED 133 in accordance with the monitoring result of the LED power supply voltage.

Other Embodiments

In the above-described embodiment, the LEDs 132 and 133 have been turned on and off in accordance with the execution status of the boot program, but the LEDs 132 and 133 may be turned on and off in accordance with the supply status of a plurality of power supplies in the information processing device 1 at the time of activation of the device. In the above-described embodiment, the power supply board 201 includes a plurality of power supplies that generate power with different voltages of 5 VDC for the control board 202 and 24 VDC for the display 11. The power supply board 201 performs the voltage generation in a predetermined order at a plurality of power supplies so that the supply of the voltage is started in a predetermined order (e.g., in ascending order of voltage) when the information processing device 1 is activated. This is called power activation. In another embodiment, there may be provided a circuit that monitors the voltage generated by each power supply and turns on and off the LED in accordance with the supply status of the voltage (that is, the power supply activation status).

A feature common to the embodiments described so far is that, in addition to the LEDs 132 and 133 being turned on and off in accordance with the communication status by the LAN controller 206, the LEDs 132 and 133 are the target for the turning-on control in accordance with the activation status of the information processing device 1.

In the above-described embodiment, the display 11 notifies the user or the service engineer of information such as an abnormal location by displaying an image, but a unit for providing notification of such information may be a speaker. For example, an abnormal location may be provided in notification by voice using a speaker.

The brightness of the light-emitting unit becomes brighter when the light-emitting unit is turned on in accordance with the activation status than when the light-emitting unit is turned on in accordance with the communication status.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the particular disclosed exemplary embodiments. The scope of the following claims is to be accorded the broadest interpretation so as to encompass all such modifications and equivalent structures and functions.

This application claims the benefit of Japanese Patent Application No. 2019-056274, filed Mar. 25, 2019, which is hereby incorporated by reference herein in its entirety.

What is claimed is:

1. An information processing device, comprising:
a light-emitting unit;
a communication unit configured to communicate with an external apparatus, and turn on and off the light-emitting unit in accordance with a communication status with the external apparatus; and
a control unit configured to turn on and off the light-emitting unit in accordance with an activation status of the information processing device,
wherein brightness when the light-emitting unit is turned on by the control unit is higher than brightness when the light-emitting unit is turned on by the communication unit.

2. The information processing device according to claim 1, wherein a value of current flawing through the light-emitting unit when the light-emitting unit is turned on by the control unit is larger than a value of current flowing through the light-emitting unit when the light-emitting unit is turned on by the communication unit.

3. The information processing device according to claim 2, comprising:
a first resistor through which the current flowing through the light-emitting unit flows when the light-emitting unit is turned on by the communication unit; and
a second resistor through which the current flowing through the light-emitting unit flows when the light-emitting unit is turned on by the control unit,
wherein a resistance value of the second resistor is smaller than a resistance value of the first resistor.

4. The information processing device according to claim 3, comprising:
a first switch into which a first control signal for controlling whether or not to allow current to flow through the light-emitting unit is input, the first switch allowing current to flow through the light-emitting unit on the basis of the input first control signal; and
a second switch into which a second control signal for controlling whether or not to allow current to flow through the light-emitting unit is input, the second switch allowing current to flow through the light-emitting unit on the basis of the input second control signal,
wherein
the communication unit outputs the first control signal, and the control unit outputs the second control signal,
the light-emitting unit is turned on when one of the communication unit or the control unit outputs a control signal for allowing current to flow through the light-emitting unit,
the first switch allows current to flow through the first resistor and the light-emitting unit on the basis of the first control signal for allowing current to flow through the light-emitting unit, the first control signal being output by the communication unit, and
the second switch allows current to flow through the second resistor and the light-emitting unit on the basis of the second control signal tier allowing current to flow through the light-emitting unit, the second control signal being output by the control unit.

5. The information processing device according to claim 2, comprising a supply unit configured to supply a voltage, wherein the supply unit makes magnitude of the voltage to be supplied larger when the light-emitting unit is turned on by the control unit than when the light-emitting unit is turned on by the communication unit.

6. The information processing device according to claim 5, wherein the control unit outputs a predetermined control signal to the supply unit, to make the magnitude of the voltage supplied by the supply unit is larger when the light-emitting unit is turned on by the control unit than when the light-emitting unit is turned on by the communication unit.

7. The information processing device according to claim 1, wherein an activation status of the information processing device is a progress status of activation processing of the information processing device, the activation processing being executed when power switch of the information processing device is turned on.

8. The information processing device according to claim 1, wherein the control unit executes a program and turns on and off the light-emitting unit in accordance with an execution status of the program.

9. The information processing device according to claim 8, wherein the program executed by the control unit performs a series of processing after supply of power to the control unit, and turns on and off the light-emitting unit in accordance with the progress status of the series of processing.

10. The information processing device according to claim 8, wherein the control unit includes a plurality of input/output ports used for communicating with another device, and the series of processing includes setting processing for the input/output ports.

11. The information processing device according to claim 9, comprising a display configured to display information, wherein the series of processing includes processing of causing power to be supplied to the display.

12. The information processing device according to claim 11, wherein the series of processing includes processing of causing information to be displayed on the display.

13. The information processing device according to claim 9, wherein the series of processing includes processing of setting the communication unit so that the communication unit is able to communicate with the external apparatus.

14. The information processing device according to claim 9, wherein the series of processing includes processing of setting the communication unit so that the communication unit is able to control turning on and off of the light-emitting unit.

15. The information processing device according to claim 8, wherein the program causes the control unit to turn on and off the light-emitting unit until the control unit executes predetermined processing in accordance with the program, and after the execution of the predetermined processing, the program sets the communication unit so that the communication unit is able to turn on and off the light-emitting unit.

16. The information processing device according to claim 15, wherein the predetermined processing is processing of receiving a signal, indicating completion of activation of a display included in the information processing device, from the display.

17. The information processing device according to claim 1, wherein the control unit includes a central processing unit (CPU).

18. The information processing device according to claim 1, wherein the communication unit includes a local area network (LAN) controller.

19. The information processing device according to claim 1, comprising a connector to which a communication cable for the communication unit and the external apparatus to communicate with each other is connected,
   wherein the light-emitting unit is provided in the connector.

20. The information processing device according to claim 1, wherein the light-emitting unit includes two light-emitting diodes (LEDs).

21. A control method for an information processing device having a light-emitting unit, the method comprising:
   a first control step of turning on and off the light-emitting unit in accordance with a progress status of activation processing of the information processing device;
   a communication step of communicating with an external apparatus; and
   a second control step of turning on and off the light-emitting unit in accordance with a communication status with the external apparatus in the communication step,
   wherein brightness when the light-emitting unit is turned on in the first control step is higher than brightness when the light-emitting unit is turned on in the second control step.

* * * * *